United States Patent [19]

Morrien

[11] 3,952,250

[45] Apr. 20, 1976

[54] RECEIVER FOR A SELECTIVE PAGING SYSTEM

[75] Inventor: Albertus Marinus Morrien, Hilversum, Netherlands

[73] Assignee: U.S. Philips Corporation, New York, N.Y.

[22] Filed: June 2, 1975

[21] Appl. No.: 582,805

Related U.S. Application Data

[63] Continuation of Ser. No. 408,402, Oct. 23, 1973, abandoned.

[30] Foreign Application Priority Data

Nov. 2, 1972 Netherlands ........................ 7214795

[52] U.S. Cl. .................................. 325/55; 325/466; 340/164 R

[51] Int. Cl.$^{2}$ ........................................ H04B 1/06

[58] Field of Search ................. 325/55, 64, 58, 361, 325/364, 466, 419–423; 340/164 R, 224, 311, 314, 384 E

[56] References Cited

UNITED STATES PATENTS

| | | | |
|---|---|---|---|
| 3,171,098 | 2/1965 | Gabrielson | 325/55 |
| 3,335,406 | 8/1967 | Clark | 325/55 |
| 3,375,443 | 3/1968 | Salmet | 325/64 |
| 3,621,399 | 11/1971 | Rabow | 325/420 |
| 3,694,757 | 9/1972 | Hanna, Jr. | 325/466 |

*Primary Examiner*—Robert L. Griffin
*Assistant Examiner*—Jin F. Ng
*Attorney, Agent, or Firm*—Frank R. Trifari; Henry I. Steckler

[57] ABSTRACT

A receiver for a selective paging system, comprising a clock pulse regenerator for generating a clock signal to be stabilized on an incoming signal, the said clock pulse regenerator being connected to an acoustic reproduction device via a make contact, having a control input having an address recognition device connection thereto, in order to supply the acoustic reproduction device with an alert tone signal correlated to the clock signal.

2 Claims, 1 Drawing Figure

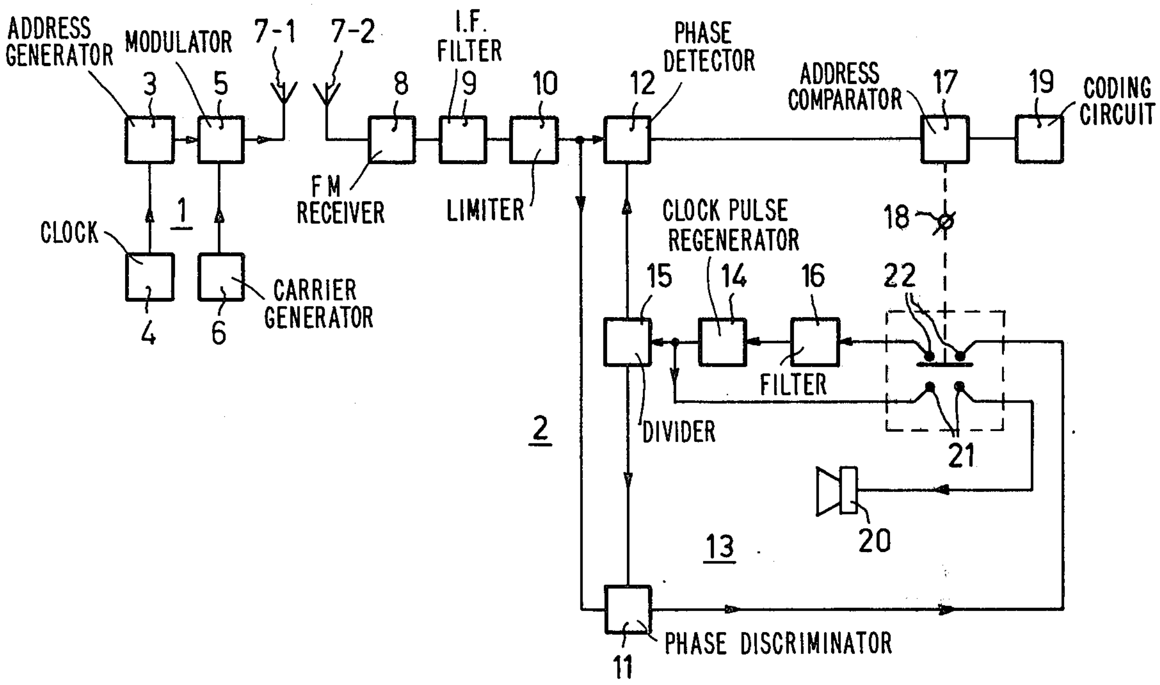
ADDRESS GENERATOR
MODULATOR
7-1
7-2
I.F. FILTER
PHASE DETECTOR
ADDRESS COMPARATOR
CODING CIRCUIT
3
5
8
9
10
12
17
19
FM RECEIVER
LIMITER
CLOCK
1
CARRIER GENERATOR
4
6
CLOCK PULSE REGENERATOR
18
15
14
16
22
FILTER
DIVIDER
2
21
20
13
PHASE DISCRIMINATOR
11

RECEIVER FOR A SELECTIVE PAGING SYSTEM

This is a continuation of application Ser. No. 408,402, filed Oct. 23, 1973, now abandoned.

The invention relates to a receiver for a selective paging system, comprising a clock signal regenerator for generating a clock signal which is to be stabilized on an incoming signal, an address recognition device, and an acoustic reproduction device.

Receivers of this kind, are used, for example, in digital person paging systems, in which the subscribers can be individually called by means of an address code which is individually assigned to each receiver. These receivers are adapted such that upon recognition of an address code by one of the receivers, the acoustic reproduction device of this receiver produces an alert signal in order to draw the attention of the relevant subscriber to a call.

Due to the fact that it must be easy for a subscriber to carry a receiver, these receivers must be small, as light as possible, and consume as little energy as possible. In known selective paging systems, the receivers are provided with a separate alert tone generator, whilst the result that they cannot completely satisfy the said requirements.

It is also known to incorporate the alert tone generator in the transmitter of the selective paging system, and to transmit an alert tone signal after each address code. However, this restricts the number of subscribers which can be called per unit of time and results in an alert tone signal which is dependent of the quality of the transmission path.

One of the objects of the invention is to realize the alert tone signal device in the receiver of the kind set forth as simply as possible, thus satisfying the described requirements.

Another object of the invention is to generate an acoustic alert tone signal having an as high as possible efficiency.

Another object yet of the invention is to render the quality of the alert tone signal independent of the quality of the transmission path.

The receiver according to the invention is characterized in that the clock signal regenerator is coupled to the acoustic reproduction device, via a make contact which is provided with a control input. The address recognition device is connected to the control input in order to make the clock pulse regenerator apply, after address recognition by the address recognition device, an alert tone signal correlated to the clock signal to the acoustic reproduction device via the make contact. According to another characteristic, the acoustic reproduction device has a high quality factor.

It is to be noted that in selective paging systems operating with tone-frequency address codes it is known to apply the last tone frequency of the address code to an acoustic reproduction device. However, this requires an acoustic reproduction device which is not overly selective so as to enable reproduction of all tone frequencies used for the address code, and this gives rise to an alert tone which is dependent of the quality of the transmission path.

The invention and its advantages will be described in detail hereinafter with reference to the embodiment shown in the FIGURE.

The FIGURE shows a digital person paging system. A system of this kind comprises a transmitter 1 and a large number of receivers 2, for example, 30,000. These receivers are designed such that they can be readily carried along by persons. Addresses in the form of decimal numbers are assigned to these receivers 2 in order to enable individual paging of each receiver 2. To this end, the transmitter 1 is provided with an address generator 3 by means of which the digits of any desired decimal number can be successively generated in binary form. Coupled to the address generator 3 is a very stable clock pulse generator 4 for causing the appearance, at the instants of the clock pulses supplied by this generator 4, of the bits of the digits generated in binary form. Furthermore, in this generator 3 the binary signals are converted into splitphase signals under the control of the clock signal, a splitphase modulated signal being a binary signal, 1 bit of which, representing the logic 1, has a high signal value during the first half of the bit time and a low signal value during the second half of the time or vice versa, and a bit having the logic value 0 and being the inverse thereof. This splitphase modulated signal is applied to a modulator 5 which also receives a carrier which is generated by a carrier generator 6. By means of the modulator 5, the carrier is frequency modulated by the splitphase signal. The frequency modulated carrier is subsequently transmitted via aerial 7-1.

A signal which is received by the aerial 7-3 is applied, via an FM receiver 8 which converts this HF signal to an intermediate frequency, to a filter 9 which serves for the suppression of interference signals situated outside the signal band. The signal is subsequently applied, via an amplifier limiter 10 which serves for adapting the analog signal supplied by the filter 9 to the digital signal form required for the remainder of the equipment, on the one side to a phase discriminator 11 and on the other side to a splitphase detector 12.

The phase discriminator 11 forms part of a phase loop 13 which also comprises a voltage-controlled clock pulse regenerator 14, a divider 15, and a filter 16. The phase of a pulse series supplied by the regenerator 14 is compared, after division in divider 15, in the phase discriminator 11 with the phase of the signal supplied by the limiter/amplifier 10. Any phase difference between the said signals is applied by the discriminator 11, in the form of a voltage signal, via filter 16, to the control input of the voltage-controlled clock pulse regenerator 14, the said regenerator being adapted to modify the supplied pulse series such that the said phase difference is reduced. Any 180° phase uncertainty between the regenerated clock pulse signal and an incoming signal is solved in a known manner which is not described herein. The clock pulse signal supplied by the dividing stage 15, the frequency of which thus corresponds to the very stable clock pulse signal generated on the transmitter side, is applied, like the signal originating from the limiter/amplifier 10, to the splitphase detector 12. By means of the regenerated clock signal, the received signal is synchronously detected in detector 12 in known manner. The signal supplied by the detector 12 is applied to an address comparison device 17, after which an address code which is assigned to the relevant receiver and which is laid down in a coding circuit 19 is applied via another input. In the case of agreement of a received address and the own address, the address recognition device supplies a control signal.

The receiver 2 is also provided with an acoustic reproduction device 20.

In known receivers, the control signal actuates an oscillator which applies an alert tone signal to the acoustic reproduction device 20 for the acoustic reproduction of this signal. The subscriber carrying the relevant receiver is then alerted to contact a message service.

In view of the fact that it must be easy for the subscribers to carry the receivers, the receivers must be as light as possible which implies inter alia that the energy consumption of this receiver must be as small as possible.

To this end, according to the invention the clock signal regenerator 14 is coupled to the acoustic reproduction device 20 via a make contact 21 which is provided with a control input 18. Moreover, the address recognition device 17 is connected to the control input 18 for making the clock pulse regenerator apply, after address recognition by the device 17, an alert signal which is correlated to the clock signal to the acoustic reproduction device 20 via the make contact 21. As a result, a separate oscillator for generating the alert tone signal is avoided, which saves weight and which makes the receiver inexpensive.

As appears from the FIGURE, the alert tone signal corresponds to the pulse series supplied by the clock pulse regenerator 14. The stability of the frequency of this pulse series corresponds to the stability of the clock signal which is generated on the transmitter side, for example, by means of a crystal-stabilized oscillator. As a result, according to the invention a resonant acoustic reproduction device having a high quality factor can be used. This offers the advantage that the electric energy is converted into acoustic energy with a high efficiency. In practice, a power of 20 mW was sufficient to generate a sufficiently loud alert tone.

By choosing a suitable number as the dividend for the divider 15, the dividend being sixteen in this embodiment, it is achieved that the frequency of the alert tone signal lies in a range in which human hearing is very sensitive. For this high frequency, amounting to 2752 Hz in this embodiment, it is moreover possible to use an acoustic reproduction device which is comparatively small and which is commercially available.

The phase error signal occurring in phase discriminator 11, caused inter alia by the jitter occurring on the transmission path, causes the clock signal to exhibit phase modulation. This phase modulation, increased by the dividend of divider 15, causes a small variation in the frequency, the said variation causing the acoustic reproduction device to produce a howling sound. In order to eliminate this drawback, a break contact 22, provided with a control input 18, is incorporated in the phase loop 13 according to the invention, the address recognition device being connected to said control input for interrupting the phase loop 13 when the make contact 21 is closed.

It is thus simply achieved that an acoustic signal is reproduced whose quality is independent of the quality of the transmission path between the transmitter 1 and the receiver 2.

What is claimed is:

1. A selective paging receiver comprising a clock signal generator means for generating clock signal energy, a phase locked loop means including said generator for stabilizing said generator onto a received signal, an address recognition means for supplying an output signal when an address in said received signal corresponds to a selected address, a high quality factor acoustic reproduction device, and means for applying said clock signal energy from said clock generator to said reproduction device for reproducing said clock signal energy comprising a make switching means coupled between said generator and said reproduction device and having a control input coupled to said recognition means for coupling said generator to said reproduction device upon said address correspondence, said reproduced clock signal energy comprising an alert signal for the paging receiver.

2. A receiver as claimed in claim 1 wherein said loop comprises a break switching means for opening said loop upon said address correspondence.

* * * * *